United States Patent
Mao et al.

(10) Patent No.: US 11,870,317 B2
(45) Date of Patent: Jan. 9, 2024

(54) VIBRATION MOTOR VIBRATION MEMBER WITH POSITION LIMITING GAP AND PROTRUDING PART FROM THE WEIGHT

(71) Applicant: AAC Microtech (Changzhou) Co., Ltd., Changzhou (CN)

(72) Inventors: Lubin Mao, Shenzhen (CN); Jie Ma, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 125 days.

(21) Appl. No.: 17/553,815

(22) Filed: Dec. 17, 2021

(65) Prior Publication Data
US 2022/0200433 A1 Jun. 23, 2022

(30) Foreign Application Priority Data
Dec. 18, 2020 (CN) .......................... 202023080643.1

(51) Int. Cl.
*H02K 33/18* (2006.01)

(52) U.S. Cl.
CPC .................................... *H02K 33/18* (2013.01)

(58) Field of Classification Search
CPC .... H02K 7/1876; H02K 7/1892; H02K 33/00; H02K 33/02; H02K 33/04; H02K 33/06; H02K 33/08; H02K 33/10; H02N 1/00; H02N 1/002; H02N 1/04
USPC .. 310/12, 12.12, 12.01, 12.03, 12.13, 12.16, 310/12.26, 15–29
See application file for complete search history.

(56) References Cited

U.S. PATENT DOCUMENTS

| | | | | |
|---|---|---|---|---|
| 7,671,493 B2* | 3/2010 | Takashima | ............. | G06F 3/016 310/15 |
| 7,859,144 B1* | 12/2010 | Sahyoun | ................ | H02K 33/16 335/229 |
| 8,278,786 B2* | 10/2012 | Woo | ....................... | H02K 33/16 310/15 |
| 8,648,502 B2* | 2/2014 | Park | ...................... | H02K 33/16 310/15 |
| 8,941,272 B2* | 1/2015 | Hong | .................... | H02K 33/18 310/15 |
| 9,024,489 B2* | 5/2015 | Akanuma | ............. | H02K 33/16 310/15 |
| 9,225,265 B2* | 12/2015 | Oh | .......................... | G06F 3/016 |

(Continued)

FOREIGN PATENT DOCUMENTS

CN 111740561 A * 10/2020

OTHER PUBLICATIONS

CN-111740561-A English Translation (Year: 2020).*

*Primary Examiner* — Maged M Almawri
(74) *Attorney, Agent, or Firm* — W&G Law Group (57) ABSTRACT

The present disclosure provides a vibration motor having a housing with an accommodation space; a vibration member and a stator in the accommodation space. The vibration member includes a weight having a main body with an accommodation cavity and a protruding part formed by extending from diagonal corners of the main body along a vibration direction of the vibration member, and a magnetic circuit system accommodated in the accommodation cavity. A position limiting gap is formed between the protruding part and the housing along the vibration direction of the vibration member. One of the objects of the present disclosure is to provide a vibration motor with improved stability of the whole system.

8 Claims, 5 Drawing Sheets

(56) References Cited

U.S. PATENT DOCUMENTS

| | | | | |
|---|---|---|---|---|
| 9,306,429 B2* | 4/2016 | Akanuma | | H02K 33/16 |
| 9,543,816 B2* | 1/2017 | Nakamura | | H02K 33/00 |
| 9,748,827 B2* | 8/2017 | Dong | | H02K 33/16 |
| 9,912,217 B2* | 3/2018 | Xu | | H02K 33/16 |
| 9,948,170 B2* | 4/2018 | Jun | | H02K 33/00 |
| 10,008,894 B2* | 6/2018 | Mao | | H02K 1/34 |
| 10,033,257 B2* | 7/2018 | Zhang | | H02K 33/12 |
| 10,063,128 B2* | 8/2018 | Wang | | H02K 33/16 |
| 10,160,010 B2* | 12/2018 | Chun | | H02K 33/16 |
| 10,307,791 B2* | 6/2019 | Xu | | B06B 1/045 |
| 10,328,461 B2* | 6/2019 | Xu | | B06B 1/045 |
| 10,483,451 B2* | 11/2019 | Wang | | H10N 30/85 |
| 10,486,196 B2* | 11/2019 | Chai | | B06B 1/045 |
| 10,491,090 B2* | 11/2019 | Zu | | H02K 33/16 |
| 10,596,596 B2* | 3/2020 | Ling | | B06B 1/045 |
| 10,674,278 B2* | 6/2020 | Zhou | | H04R 9/025 |
| 10,763,732 B2* | 9/2020 | Liu | | H02K 33/18 |
| 10,886,827 B2* | 1/2021 | Liu | | H02K 33/14 |
| 11,050,334 B2* | 6/2021 | Mori | | H02K 33/18 |
| 11,626,786 B2* | 4/2023 | Maeda | | H02K 33/02 |
| | | | | 310/29 |
| 11,641,152 B2* | 5/2023 | Cui | | H02K 35/02 |
| | | | | 310/28 |
| 2006/0131965 A1* | 6/2006 | Friedland | | H02K 26/00 |
| | | | | 310/12.22 |
| 2009/0267423 A1* | 10/2009 | Kajiwara | | H02K 33/02 |
| | | | | 310/38 |
| 2010/0213773 A1* | 8/2010 | Dong | | H02K 33/16 |
| | | | | 310/25 |
| 2011/0018364 A1* | 1/2011 | Kim | | H02K 33/18 |
| | | | | 310/20 |
| 2011/0068640 A1* | 3/2011 | Choi | | H02K 5/04 |
| | | | | 310/25 |
| 2011/0089772 A1* | 4/2011 | Dong | | H02K 33/16 |
| | | | | 310/25 |
| 2011/0115311 A1* | 5/2011 | Dong | | H02K 33/16 |
| | | | | 310/28 |
| 2011/0133577 A1* | 6/2011 | Lee | | H02K 33/18 |
| | | | | 310/15 |
| 2012/0025633 A1* | 2/2012 | Lee | | H04N 23/55 |
| | | | | 310/12.16 |
| 2012/0153748 A1* | 6/2012 | Wauke | | H02K 33/16 |
| | | | | 310/25 |
| 2012/0187780 A1* | 7/2012 | Bang | | H02K 33/16 |
| | | | | 310/25 |
| 2012/0313459 A1* | 12/2012 | Zhang | | H02K 33/18 |
| | | | | 310/25 |
| 2013/0099600 A1* | 4/2013 | Park | | B06B 1/045 |
| | | | | 310/15 |
| 2015/0123498 A1* | 5/2015 | Yang | | H02K 33/16 |
| | | | | 310/25 |
| 2016/0173990 A1* | 6/2016 | Park | | H04R 9/043 |
| | | | | 381/354 |
| 2017/0033653 A1* | 2/2017 | Wang | | H02K 33/16 |
| 2017/0033657 A1* | 2/2017 | Mao | | H02K 33/16 |
| 2017/0104401 A1* | 4/2017 | Umehara | | H02K 33/06 |
| 2017/0110920 A1* | 4/2017 | Mao | | H02K 1/34 |
| 2017/0179804 A1* | 6/2017 | Xu | | H02K 33/16 |
| 2017/0288519 A1* | 10/2017 | Kim | | H02K 33/00 |
| 2018/0021812 A1* | 1/2018 | Akanuma | | H02K 33/00 |
| | | | | 310/25 |
| 2018/0241292 A1* | 8/2018 | Zu | | H02K 33/02 |
| 2018/0297062 A1* | 10/2018 | Huang | | H02K 11/33 |
| 2019/0207496 A1* | 7/2019 | Takahashi | | H02K 33/18 |

\* cited by examiner

VIBRATION MOTOR VIBRATION MEMBER WITH POSITION LIMITING GAP AND PROTRUDING PART FROM THE WEIGHT

FIELD OF THE PRESENT DISCLOSURE

The present disclosure relates to motors, in particular to a vibration motor for providing tactile feedback.

DESCRIPTION OF RELATED ART

With the development of electronic technology, the silent notification of incoming calls from mobile communication terminal devices such as mobile phones needs to rely on the vibration of the body to remind users. The component that generates vibration is the built-in vibration motor, and the core components of small medical and health care equipment such as vibration massagers are also built-in vibration motors. However, the existing vibration motor is generally limited by elastic support and limiting baffles. The structure is relatively complicated, and the elastic support often directly hits the inner wall of the housing when the position is limited, resulting in low reliability of the vibration motor.

Therefore, it is necessary to provide a new mechanism to solve the above technical problems.

SUMMARY OF THE PRESENT DISCLOSURE

One of the objects of the present disclosure is to provide a vibration motor with improved stability of the whole system.

To achieve the above-mentioned objects, the present disclosure provides a vibration motor having a housing with an accommodation space; a vibration member and a stator in the accommodation space. The vibration member includes a weight having a main body with an accommodation cavity and a protruding part formed by extending from diagonal corners of the main body along a vibration direction of the vibration member, and a magnetic circuit system accommodated in the accommodation cavity. A position limiting gap is formed between the protruding part and the housing along the vibration direction of the vibration member.

Further, the housing comprises a first cover plate, a second cover plate spaced from the first cover plate, and a side surrounding wall for connecting the first cover plate to the second cover plate for forming the accommodation space; the side surrounding wall comprises a first side plate arranged on opposite sides of the vibration member along the vibration direction and a second side plate connected to the first side plate; the position limiting gap is formed between the protruding part and the second side plate along the vibration direction.

Further, wherein an amount of the protruding part is two, and two protruding parts are symmetrical with respect to a center of the vibration member, the main body comprises a body part, a first position limit part and a second position limit part, the first position limit part and the second position limit part connected to opposite sides of the body part along the vibration direction, respectively;
 one protruding part extends from the first position limit part along the vibration direction, the other protruding part extends from the second position limit part along the vibration direction.

The vibration motor further comprises an elastic support suspending and supporting the vibration member in the accommodation space for providing elastic restoring force to the vibration member; wherein the elastic support is arranged around the weight.

Further, the elastic support comprises two elastic support arms symmetrical with respect to the center of the vibration member; each of the elastic support arms comprises an elastic arm part, a first connection part extending from one end of the elastic arm part and connected to the second side plate, and a first connection part extending from the other end of the elastic arm part and connected to the main body; the second connection part is located between the first connection part and the main body.

Further, a projection of the elastic support arm along the vibration direction does not overlap with a projection of the protruding part along the vibration direction.

Further, the elastic support arm further comprises a first soldering sheet connecting the first connection part to the second side plate, a second soldering sheet connecting the second connection part to the main body, and a position limiting block installed on a side of the second connection part facing the first connection part.

Further, the magnetic circuit system comprises a magnet installed in the accommodation cavity of the main body, a first magnetic conductive sheet on a side of the magnet facing the first cover plate, a first iron core between the first magnetic conductive sheet and the first cover plate, a second magnetic conductive sheet on a side of the magnet facing the second cover plate, and a second iron core between the second magnetic conductive sheet and the second cover plate; the stator comprises a first voice coil wound around the first iron core and a second voice coil wound around the second iron core.

Further, a central axis of the first voice coil is collinear with a central axis of the second voice coil.

Further, the stator further comprises a circuit board installed on the housing for electrically connecting to the first voice coil and the second voice coil.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby is only to explain the disclosure, not intended to limit the disclosure.

It should be noted that all directional indications (such as up, down, left, right, front, back, inside, outside, top, bottom . . . ) in the embodiments of the present disclosure are only used to explain in a specific posture (such as shown in the figures). If the specific posture changes, the relative positional relationship between the components will also change accordingly.

It should also be noted that when an element is referred to as being "fixed on" or "arranged on" another element, the element may be directly on the other element or there may be a centering element at the same time. When an element is referred to as being "connected" to another element, it can be directly connected to the other element or an intermediate element may be present at the same time.

Please refer to FIGS. 1-5 together. The present disclosure provides a vibration motor, which comprises a housing 1 having an accommodation space 10, and a vibration member 2 and a stator 3 accommodated in the accommodation space 10.

Please refer to FIGS. 1-5, the vibration member 2 comprises a weight 21 and a magnetic circuit system 22. The weight 21 comprises a main body 211 provided with an accommodation cavity 2110 and a protruding part 212 formed by extending from diagonally opposite corners of the main body 211 along the vibration direction of the vibration member 2. A position limiting gap is formed between the protruding part 2110 and the housing 1 along the vibration direction of the vibration member 2. The magnetic circuit system 22 is accommodated in the accommodation cavity 2110.

When the magnetic circuit system 22 is working, the weight 21 vibrates along the vibration direction of the vibration member 2 under the action of the magnetic circuit system 22. At this time, due to the setting of the protruding part 212, the vibration member 2 can be restricted by the protruding part 212. This help simplify the structure of the vibration motor, it also effectively avoids the reliability problem caused by directly hitting the inner wall of the housing 1 when only the elastic support 4 is used to limit the position.

In a preferred embodiment, the housing 1 comprises a first cover plate 11, a second cover plate 12 opposite to the first cover plate 11 and arranged at intervals, and a side surrounding wall 13 arranged between the first cover plate 11 and the second cover plate 12. The side surrounding wall 13 is connected to the first cover plate 11 and the second cover plate 12 to enclose the accommodation space 10.

Further, the side surrounding wall 13 comprises a first side plates 131 provided on opposite sides of the vibration member 2 along the vibration direction, and a second side plate 132 connected to the first side plate 131. Through the end-to-end connection of the first side plate 131 and the second side plate 132, the side surrounding wall 13 is formed.

The position limiting gap is formed between the protruding part 212 and the second side plate 132 along the vibration direction.

When the weight 21 vibrates under the action of the magnetic circuit system 22, the protruding part 212 is limited to the second side plate 132. The distance between the protruding part 212 and the second side plate 132 is the width of the position limiting gap 101. The width of the position limiting gap is the short limit distance of the vibration motor. That is, the housing 1 and the weight 21 are used for the limiting position.

Figure 4:
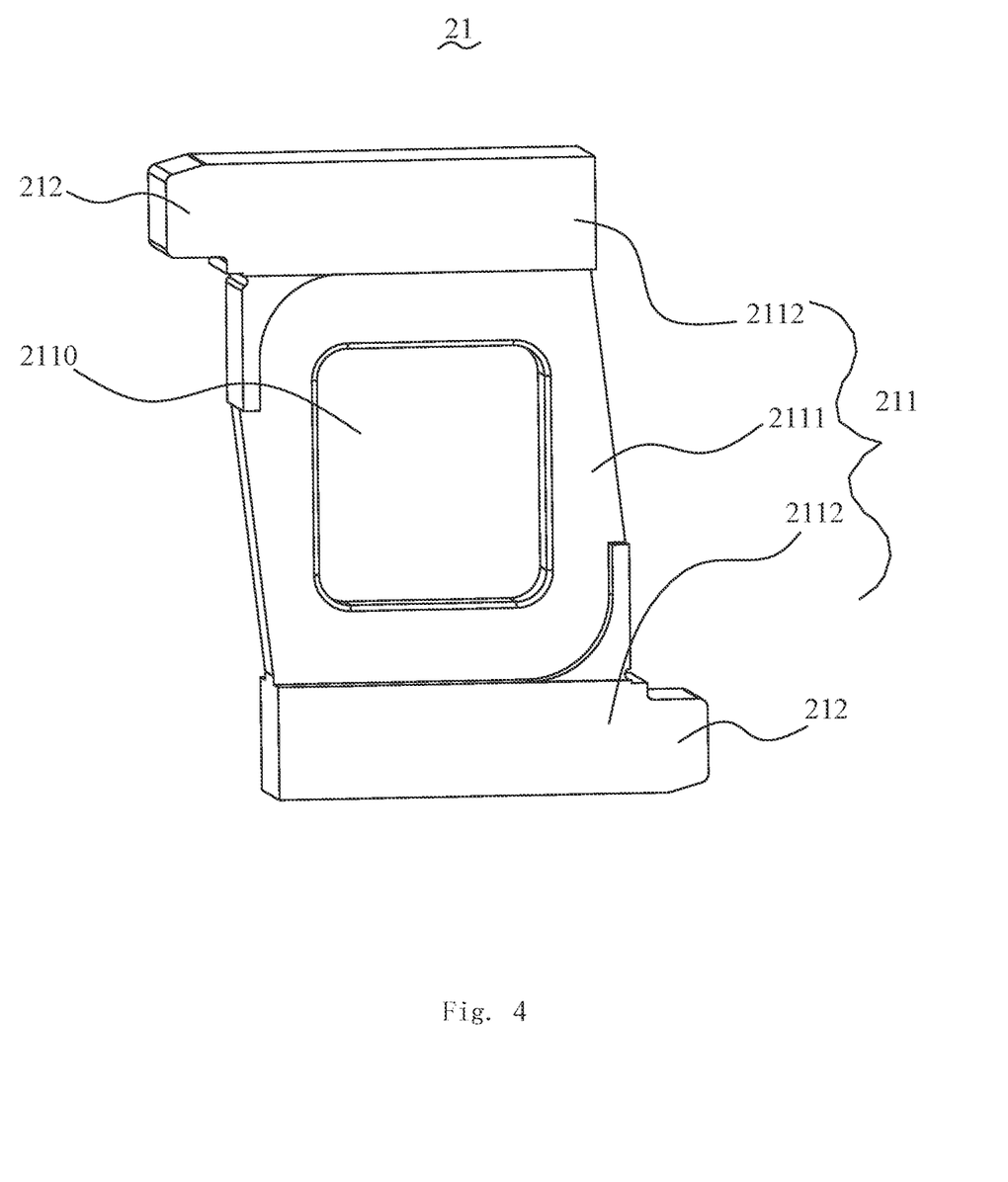
FIG. 4 is an isometric view of a weight of the vibration motor.

Referring to FIG. 4, in a preferred embodiment, the main body 211 comprises a body part 2111, a first position limit part 2112, and a second position limit part 2113. The first position limit part 2112 and the second position limit part 2113 are respectively connected on opposite sides of the body part 2111 along the vibration direction. Two of the protruding parts 212 are provided. One of the protruding parts 212 is formed by extending from the first position limit part 2112 along the vibration direction. The other said protruding part 212 is formed by extending from the second position limit part 2113 along the vibration direction. The two protruding parts 212 are symmetrical with respect to the center of the vibration member. Understandably, the first position limit part 2112 extends along the vibration direction to form one of the protruding parts 212. The second position limit part 2113 extends along the vibration direction to form the other one of the protruding parts 212. The protruding part 212 formed on the first position limit part 2112 and the protruding part 212 formed on the second position limit part 2113 are symmetrical with respect to the center of the vibration member 2.

When the vibration member 2 vibrates in different directions, it can be restricted by the protruding part 212 formed on the first position limit part 2112 or by the protruding part 212 formed on the second position limit part 2113 respectively.

Figure 1:
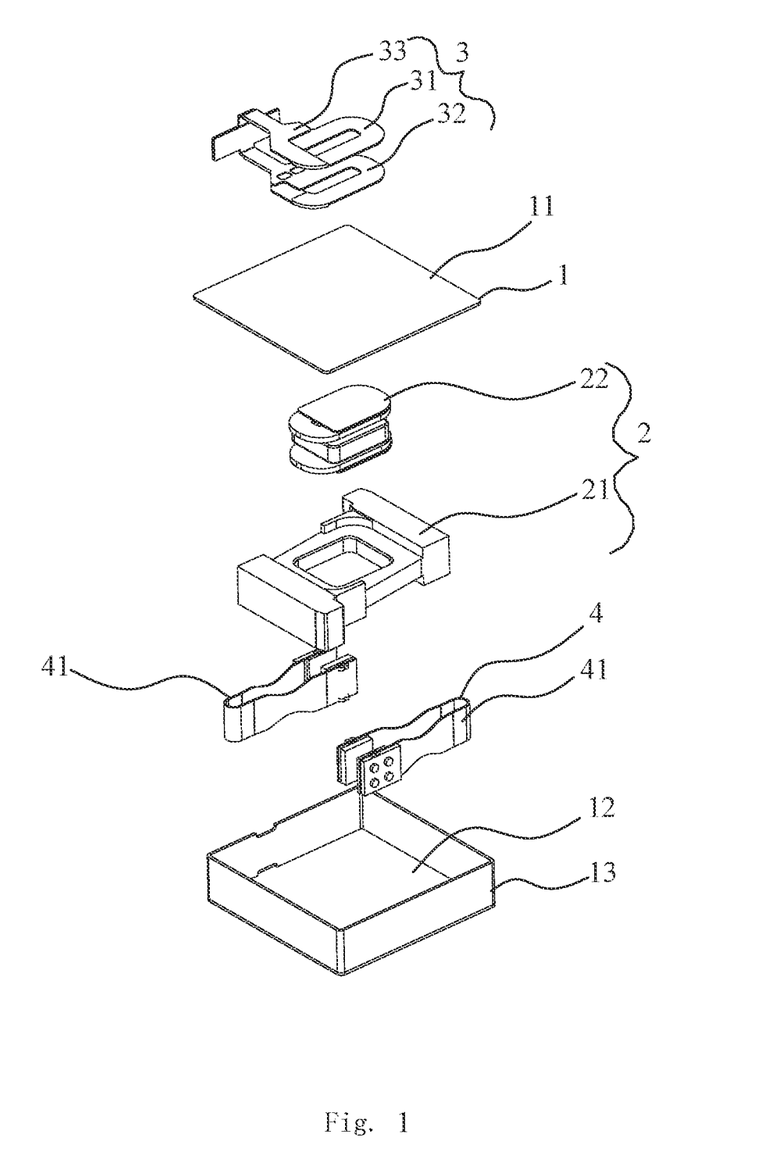
FIG. 1 is an isometric and exploded view of a vibration motor in accordance with an exemplary embodiment of the present disclosure.
Figure 3:
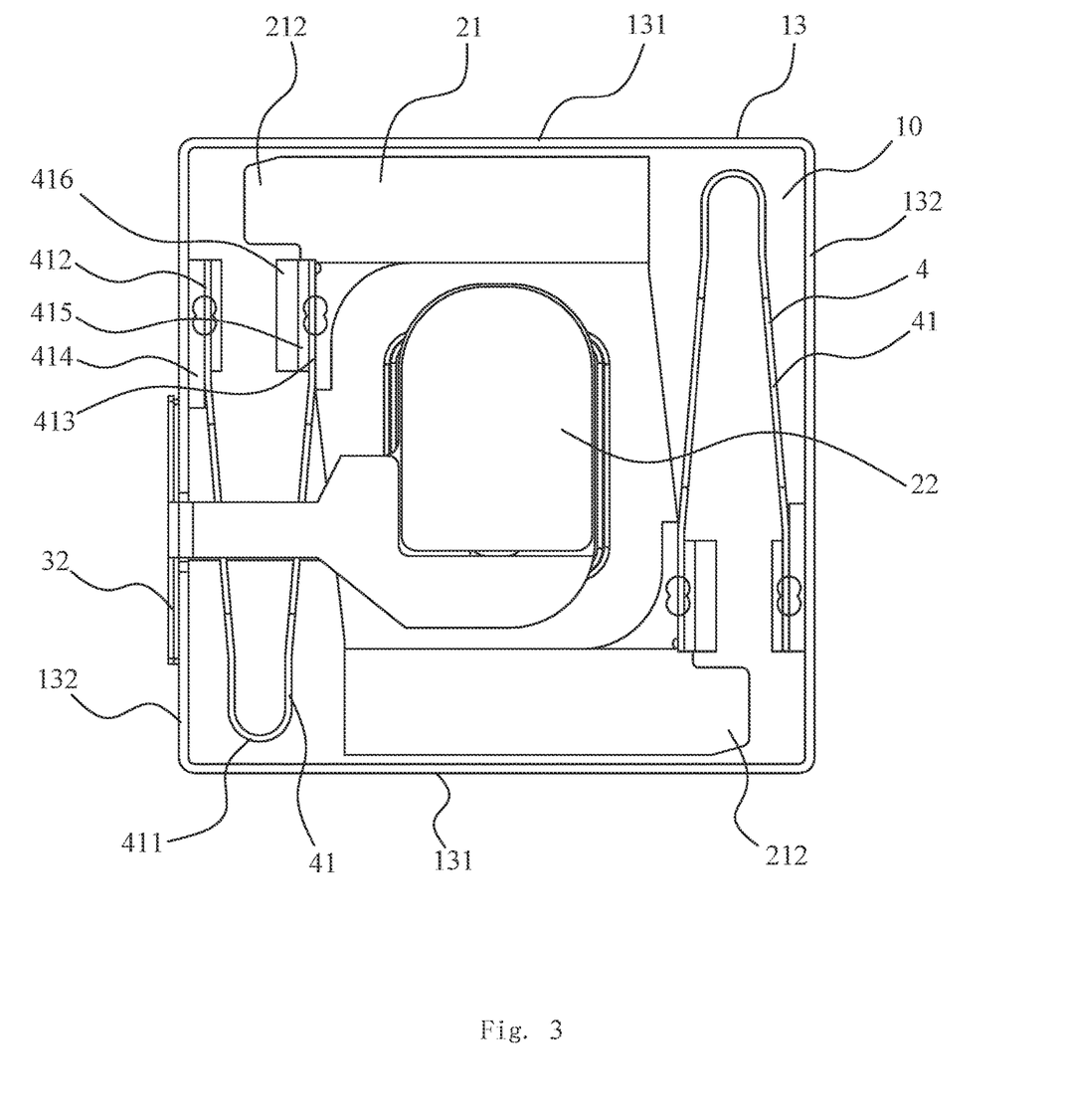
FIG. 3 is a top view of the vibration motor with a first cover plate thereof removed.

Please refer to FIGS. 1 and 3, in a preferred embodiment, the vibration motor further comprises an elastic support 4 for suspending and supporting the vibration member 2 in the accommodation space 10 and providing elastic restoring force for the vibration member 2. The elastic support 4 is arranged around the weight 21.

The elastic support 4 can stably support the vibration member 2 in the accommodation space 10 when the vibration member 2 vibrates. At the same time, the elastic support 4 can restore the vibration member 2 to the initial position (the position before the vibration occurs) when the vibration member 2 stops vibrating.

Please refer to FIG. 1 and FIG. 3. In a preferred embodiment, the elastic support 4 comprises two elastic support arms 41. Two of the elastic support arms 41 are distributed symmetrically with respect to the center of the vibration member 2. The elastic support arm 41 comprises an elastic arm part 411, a first connection part 412 extending from one end of the elastic arm part 411 and connected to the second side plate 132, and a second connection part 413 extending from the other end of the elastic arm part 411 and connected to the main body 211. The second connection part 413 is located between the first connection part 412 and the main body 211.

The first connection part 412 of the two elastic support arm 41 is connected to the second side plate 132 respectively. The second connection part 413 of the two elastic support arm 41 is connected to the main body 211 respectively. The structure of the elastic support 41 and its fixing method to the vibration member 2 and the housing 1 enable the vibration motor to achieve vibration and improve the performance of the vibration motor.

Please refer to FIG. 3. In a preferred embodiment, the length of the elastic support arm 41 along the direction perpendicular to the vibration direction of the vibration member is less than the distance between the two first side plates 131. The protruding part 212 is located between the elastic support arm 41 and the first side plate 131.

Further, the gap between the first connection part 412 and the second connection part 413 is the internal movement gap of the elastic support arm 41. The width of the internal movement gap is close to the width of the position limiting gap. Thus, the elastic support arm 41 plays the role of auxiliary limit, it effectively avoids the reliability problem caused by directly hitting the second side plate 132 when only the elastic support arm 41 is used for position limit.

Please refer to FIGS. 1 and 3, in a preferred embodiment, the elastic support arm 41 also includes a first soldering sheet 414 connecting the first connection part 412 and the second side plate 132, a second soldering sheet 415 connecting the second connection part 413 with the main body, and a position limiting block 416 installed on the side of the second connection part 413 facing the first connection part 412. The position limiting block 416 can reduce the collision friction between the second connection part 413 and the first connection part 412 when the vibration member 2 vibrates, thereby improving reliability. Preferably, the position limiting block 416 is a soft limit glue.

Please refer to FIGS. 1 and 3, in a preferred embodiment, the projection of the elastic support arm 41 along the vibration direction does not overlap with the projection of the protruding part 212 along the vibration direction. Understandably, the projections of the components of the elastic support arm 41 along the vibration direction do not overlap with the projection of the protruding part 212 along the vibration direction. The projection of the first soldering sheet 414 along the vibration direction, the projection of the second soldering sheet 415 along the vibration direction, and the projection of the position limiting block 416 along the vibration direction do not overlap with the projection of the protruding part 212 along the vibration direction.

Figure 5:
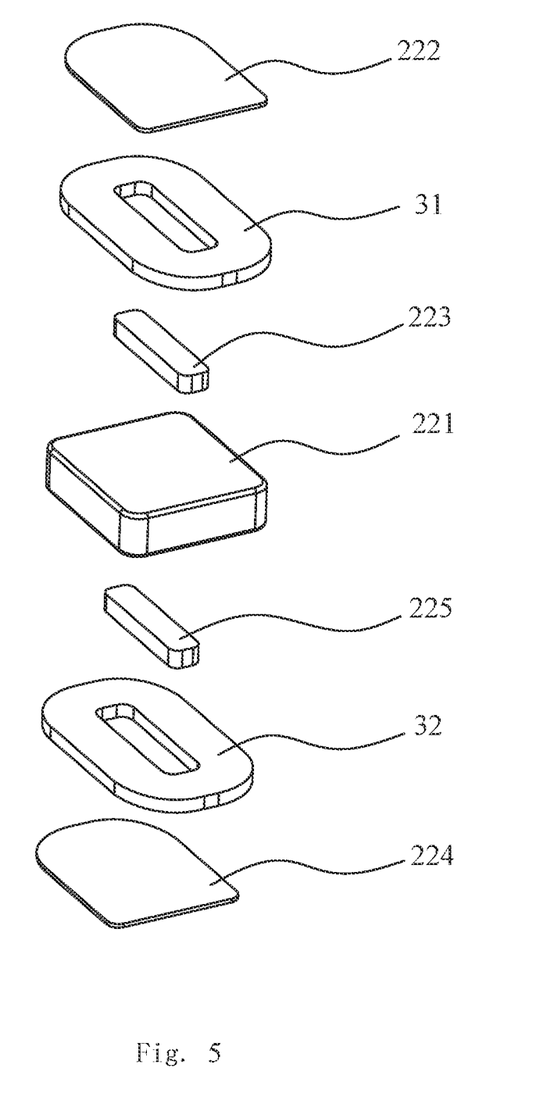
FIG. 5 is an isometric and exploded view of a magnetic circuit system, a first voice coil, and a second voice coil of the vibration motor.

Please refer to FIGS. 1 and 5, in a preferred embodiment, the magnetic circuit system 22 comprises a magnet 221 installed in the accommodation cavity 211 of the main body 211, a first magnetic conductive sheet 222 arranged on the side of the magnet 221 facing the first cover plate 11, a first iron core 223 is arranged between the first magnetic conductive sheet 222 and the first cover plate 11, a second magnetic conductive sheet 224 arranged on the side of the magnet 221 facing the second cover plate 12, and a second iron core 225 arranged between the second magnetic conductive sheet 224 and the second cover plate 12.

The stator 3 comprises a first voice coil 31 wound on the first iron core 223 and a second voice coil 32 wound on the second iron core 225.

When the first voice coil 31 and the second iron core 225 are powered on, the first iron core 223 and the second iron core 225 will be polarized, respectively. Under the action of the first iron core 223 and the second iron core 225, the magnet 221 will move along the vibration direction of the vibration member 2. Thereby, the weight 21 is driven to move synchronously with the magnet 221, and the vibration of the vibration member 2 is realized.

In a preferred embodiment, as shown in FIG. 5, the central axis of the first voice coil 31 and the central axis of the second voice coil 32 are collinear to form the magnetic circuit system 22.

Figure 2:
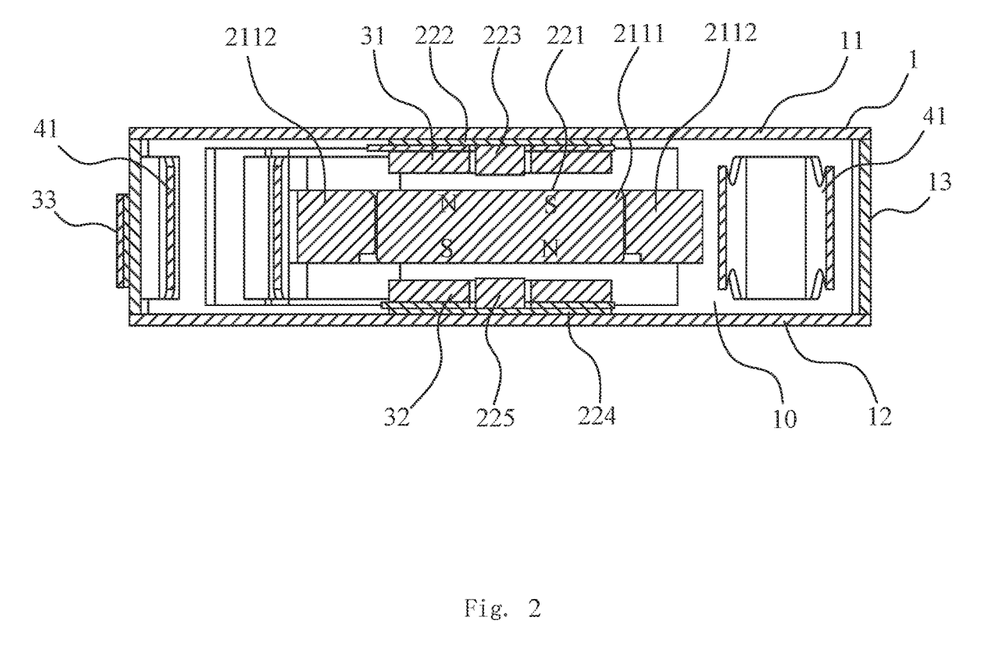
FIG. 2 is a cross-sectional view of the vibration motor.

In a preferred embodiment, as shown in FIGS. 2 and 5, the magnet 221 is an integrated magnetized magnet. The magnetization of the integrated magnetized magnet is shown in FIG. 2.

Please refer to FIG. 1 and FIG. 2. In a preferred embodiment, the stator 3 further comprises a circuit board 33 installed on the housing 1 and electrically connected to the first voice coil 31 and the second voice coil 32. The circuit board 32 is used to supply power to the first voice coil 31 and the second voice coil 32.

The present disclosure provides a vibration motor, which comprises a protruding part 212 formed by extending along the vibration direction of the vibration member 2 at the diagonal corner of the main body 211 of the weight 21. A position limiting gap is formed between the protruding part 212 and the housing 1 along the vibration direction of the vibration member 2. When the vibration member 2 vibrates, the vibration member 2 can be restricted by the protruding part 212 of the weight 21, and be mainly restricted by the protruding part 212 of the weight 21.

The internal movement space of the elastic support arm 41 serves as an auxiliary limit. The setting of the limiting baffle is cancelled, and the structure of the vibration motor is simplified. At the same time, it also effectively avoids reliability problems caused by directly hitting the inner wall of housing 1 when only elastic support arm 41 is used to limit the position. In addition, the structure of the weight 21 is of great significance to a larger-sized vibration motor. The weight 21 with the protruding part 212 can effectively utilize the internal space of the vibration motor. At the same time, the mass of the weight 21 is increased, and the shock feeling is enhanced.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:
1. A vibration motor, comprising:
a housing with an accommodation space;
a vibration member in the accommodation space, comprises a weight having a main body with an accommodation cavity and a protruding part formed by extending from diagonal corners of the main body along a vibration direction of the vibration member, and a magnetic circuit system accommodated in the accommodation cavity;
a stator in the accommodation space;
a position limiting gap formed between the protruding part and the housing along the vibration direction of the vibration member;
wherein the housing comprises a first cover plate, a second cover plate spaced from the first cover plate, and a side surrounding wall for connecting the first cover plate to the second cover plate for forming the accommodation space;
the side surrounding wall comprises a first side plate arranged on opposite sides of the vibration member along the vibration direction and a second side plate connected to the first side plate; the position limiting gap is formed between the protruding part and the second side plate along the vibration direction; and
wherein an amount of the protruding part is two, and two protruding parts are symmetrical with respect to a center of the vibration member, the main body comprises a body part, a first position limit part and a second position limit part, the first position limit part and the second position limit part connected to opposite sides of the body part along the vibration direction, respectively;

one protruding part extends from the first position limit part along the vibration direction, the other protruding part extends from the second position limit part along the vibration direction.

2. The vibration motor as described in claim 1, wherein the magnetic circuit system comprises a magnet installed in the accommodation cavity of the main body, a first magnetic conductive sheet on a side of the magnet facing the first cover plate, a first iron core between the first magnetic conductive sheet and the first cover plate, a second magnetic conductive sheet on a side of the magnet facing the second cover plate, and a second iron core between the second magnetic conductive sheet and the second cover plate;

the stator comprises a first voice coil wound around the first iron core and a second voice coil wound around the second iron core.

3. The vibration motor as described in claim 2, wherein a central axis of the first voice coil is collinear with a central axis of the second voice coil.

4. The vibration motor as described in claim 2, wherein the stator further comprises a circuit board installed on the housing for electrically connecting to the first voice coil and the second voice coil.

5. The vibration motor as described in claim 1 further comprising an elastic support suspending and supporting the vibration member in the accommodation space for providing elastic restoring force to the vibration member; wherein the elastic support is arranged around the weight.

6. The vibration motor as described in claim 5, wherein the elastic support comprises two elastic support arms symmetrical with respect to the center of the vibration member; each of the elastic support arms comprises an elastic arm part, a first connection part extending from one end of the elastic arm part and connected to the second side plate, and a first connection part extending from the other end of the elastic arm part and connected to the main body; the second connection part is located between the first connection part and the main body.

7. The vibration motor as described in claim 6, wherein a projection of the elastic support arm along the vibration direction does not overlap completely with a projection of the protruding part along the vibration direction.

8. The vibration motor as described in claim 6, wherein the elastic support arm further comprises a first soldering sheet connecting the first connection part to the second side plate, a second soldering sheet connecting the second connection part to the main body, and a position limiting block installed on a side of the second connection part facing the first connection part.

* * * * *